W. J. ELVIN.
Bee Hive.

No. 79,454.

Patented June 30, 1868.

INVENTOR:
W. J. Elvin

WITNESSES:

United States Patent Office.

WILLIAM J. ELVIN, OF NORTH MADISON, INDIANA.

Letters Patent No. 79,454, dated June 30, 1868.

IMPROVEMENT IN BEE-HIVES.

*The Schedule referred to in these Letters Patent and making part of the same.*

TO ALL WHOM IT MAY CONCERN:

Be it known that I, WILLIAM J. ELVIN, of North Madison, in the county of Jefferson, and State of Indiana, have invented a new and useful Improvement in Bee-Hives; and I do hereby declare that the following is a full, clear, and exact description thereof, which will enable those skilled in the art to make and use the same, reference being had to the accompanying drawings, forming part of this specification.

The object of this invention is to make the brood-boxes of the bee-hive adjustable, so that they may be lifted out at the top when the cover of the hive is taken off, and also to construct the base of a hive in the form of a trough, with an opening at the bottom, through its entire length, for the purpose of allowing dead bees or refuse of any kind to fall out.

Similar letters of reference indicate corresponding parts.

Description.

A is the body of the hive.

Figure 1:
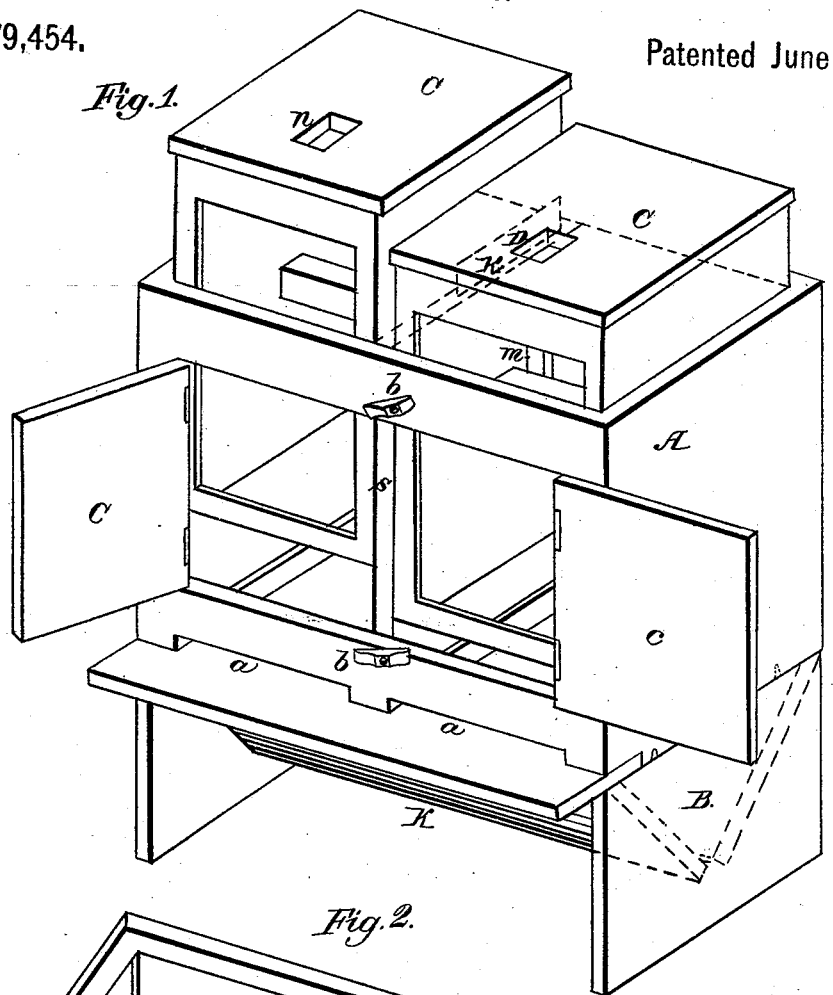
Figure 1 is a perspective view of the hive, with the doors open, to show the interior, with the cover off.

B is the base, formed of two rectangular end-pieces, with the boards K, these boards being placed obliquely downwards, so as to form a trough, as shown in dotted lines, fig. 1, but having a space or slot left between their lower edges, of sufficient width to allow of the free exit of dead bees or other refuse substance that may fall down from the hive. The hive is set on this base, and secured from falling off by means of dowels, as shown.

C C are the brood-boxes, shown partially raised. These boxes have glazed fronts, and are without bottoms, but rest, when down, on cleats in the hive A. In the sides of the boxes, adjoining the partition s, are openings m, which correspond with each other, and with similar openings in the partition. Said partition is provided with a slide, of zinc, (see k, dotted lines,) for closing the openings when desired.

a a are openings under the hive, for the admission of the bees.

c c are doors, hung in the front of the hive A, and fastened by the buttons b b.

Figure 2:
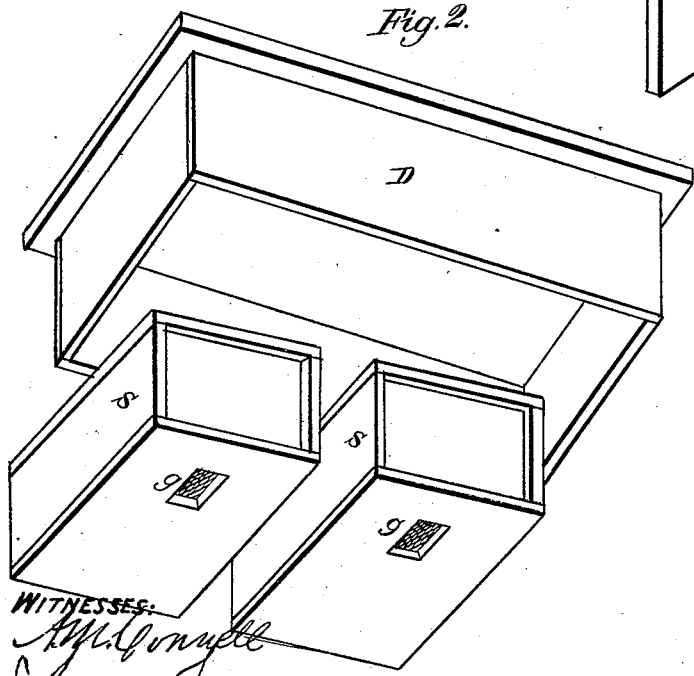
Figure 2 is a perspective view of the two honey-boxes, and the cap or cover of the hive.

S S, fig. 2, are the honey-boxes, with glazed ends. These boxes are placed upon the brood-boxes, the openings g g in the former coinciding with the openings n n of the latter.

The cover D is placed over the boxes S S, its lower edge resting on the top of the hive A.

I am aware that the cover D, of substantially the form shown, and also the honey-boxes S S, have been used before, and therefore do not wish to claim them.

Having thus described my invention, what I claim as new, and desire to secure by Letters Patent, is—

The bee-hive herein described, when its several parts are constructed, combined, and arranged as set forth.

Witness my hand, this 12th day of March, 1868.

W. J. ELVIN.

Witnesses:
HENRY CONNETT, Jr.,
JAMES NEILL.